(12) United States Patent
Wu et al.

(10) Patent No.: US 11,580,233 B1
(45) Date of Patent: Feb. 14, 2023

(54) BASEBOARD-MANAGEMENT-CONTROLLER STORAGE MODULE

(71) Applicant: Meta Platforms, Inc., Menlo Park, CA (US)

(72) Inventors: Lingjun Wu, San Jose, CA (US); Ahmad Byagowi, Fremont, CA (US); Hans-Juergen Schmidtke, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 571 days.

(21) Appl. No.: 16/682,943

(22) Filed: Nov. 13, 2019

(51) Int. Cl.
*G06F 12/00* (2006.01)
*G06F 21/60* (2013.01)
*G06F 3/06* (2006.01)

(52) U.S. Cl.
CPC ............ *G06F 21/60* (2013.01); *G06F 3/0604* (2013.01); *G06F 3/0655* (2013.01); *G06F 3/0679* (2013.01)

(58) Field of Classification Search
CPC ...... G06F 21/60; G06F 3/0604; G06F 3/0655; G06F 3/0679
USPC .......................................................... 726/29
See application file for complete search history.

(56) References Cited

U.S. PATENT DOCUMENTS

| | | | |
|---|---|---|---|
| 8,417,774 B2 * | 4/2013 | Flynn ................... | G06F 12/0804 714/E11.154 |
| 8,928,393 B1 * | 1/2015 | Cobo ..................... | G01K 3/005 327/512 |
| 2018/0150293 A1 * | 5/2018 | Nachimuthu ....... | H03M 7/6017 |

* cited by examiner

*Primary Examiner* — Mardochee Chery
(74) *Attorney, Agent, or Firm* — Van Pelt, Yi & James LLP

(57) ABSTRACT

A system including a baseboard management controller (BMC) and a socket is described. The BMC is configured to provide a management interface to a network device. The socket is configured to accept an edge connector of a removable storage card. The BMC is configured to access via the socket at least a portion of the firmware of the BMC stored on the removable storage card.

20 Claims, 3 Drawing Sheets

BASEBOARD-MANAGEMENT-CONTROLLER STORAGE MODULE

BACKGROUND OF THE INVENTION

A baseboard management controller (BMC) is a microcontroller that is embedded in a circuit board of a network device. For example, the BMC may be embedded on the main board of a server. The BMC provides a management interface for the network device. Thus, the BMC monitors and manages status of the network device, and may do so independently of the operating system of the network device. The BMC receives data from the network device, stores the data in embedded memory on the circuit board, and takes appropriate action. The BMC may also communicate with other network devices. As part of its operation, the BMC may rely upon trusted communication and, therefore, utilize certificates and/or security keys. Firmware for the BMC and data for the BMC, such as security information and/or sensor data, are typically stored in embedded memory on the main board.

Network devices, such as those in a data center, are routinely upgraded. As a result, a network device including a BMC may be decommissioned. In order to maintain security for the network, the main board and its components are typically destroyed. However, such measures may be expensive, time-consuming and wasteful. Consequently, another mechanism for maintaining security of a network device including a BMC is desired.

BRIEF DESCRIPTION OF THE DRAWINGS

Various embodiments of the invention are disclosed in the following detailed description and the accompanying drawings.

DETAILED DESCRIPTION

Figure 1A:
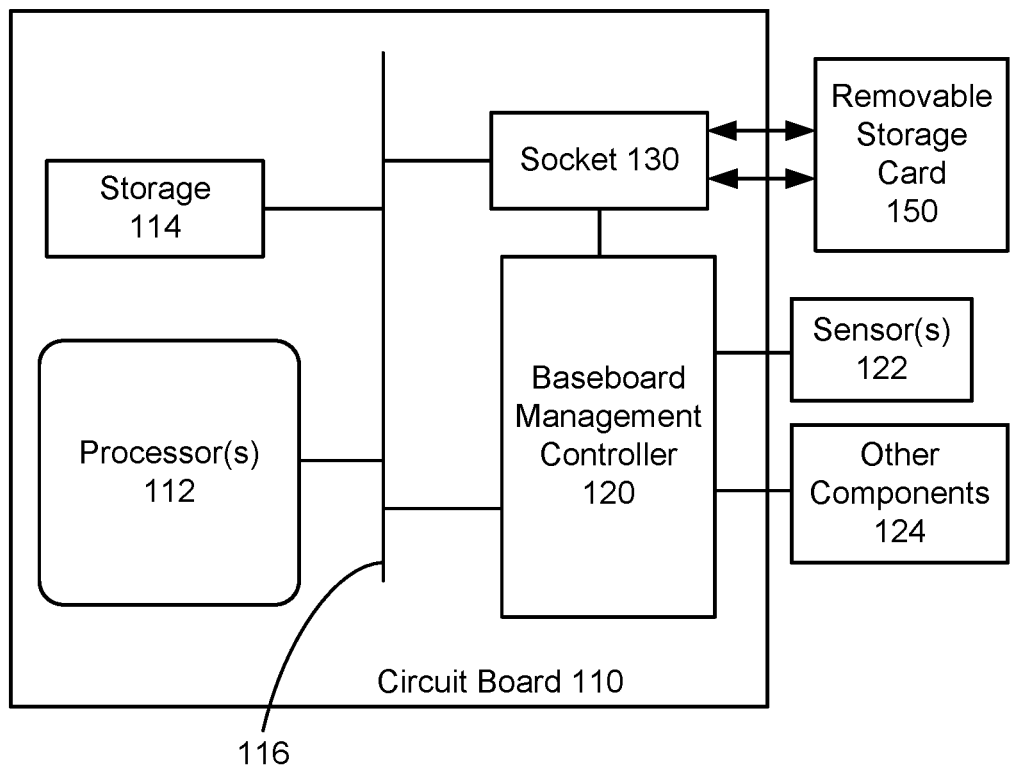
FIGS. 1A-1B depict an embodiment of a system including a circuit board having a baseboard management controller and a removable storage card and an embodiment of a removable storage card.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A baseboard management controller (BMC) is a microcontroller that is typically embedded in the main board of a network device, such as a server or top of rack (ToR) switch. The BMC can independently monitor and control the network device. For example, the BMC be used to diagnose issues the network device even when the network device is powered down or the operating system of the network device has suffered a failure. During operation, the BMC receives data from various sensors or components of the network device. For example, the BMC may receive data such as temperature of the network device, voltage on particular lines, fan speed, power status, and operating system status for the network device. The BMC typically stores this data on the embedded memory of the main board. Based on these inputs, the BMC can provide warnings and control various components. For example, the BMC may receive temperature data from the network device, store the temperature data in the embedded memory and provide an alert if the temperature is above a threshold. The BMC of a particular network device may also communicate with a BMC in another network device. For example, the BMC of a ToR switch in a data center rack may communicate with the BMCs of the servers in the rack. This interaction may take place via trusted communication. Thus, the BMC may utilize certificates or encryption for such communication. The BMC typically utilizes embedded memory on the main board. For example, firmware for the BMC; certificates, keys and other encryption information used by the BMC for in secure communication and the data provided to the BMC from the sensor(s) and component(s) are generally stored in embedded memory on the main board.

The network device in which the BMC operates may be decommissioned. For example, the server or ToR switch may be desired to be replaced, allowing performance of the network such to be upgraded. In order to maintain security for the network devices, the main board and its components are typically destroyed. For example, privacy of the firmware for the BMC and certificates described above may be ensured by destroying the main board and the embedded memory on the main board. However, destroying all of the components on the main board may be costly and wasteful. Consequently, another mechanism for maintaining security of a network device including a BMC is desired.

A system comprising a BMC and a socket are described. The BMC provides a management interface to a network device. The socket is configured to accept an edge connector of a removable storage card. The removable storage card may thus be removably connected to the socket. At least a portion of the firmware of the BMC is stored on the removable storage card. The BMC accesses, via the socket, the firmware on the removable storage card.

The removable storage card may include the edge connector and memory, such as one or more flash memory devices. In some embodiments, the flash memory device(s) on the removable storage card stores the firmware for the BMC. The flash memory device(s) of the removable storage card may include NAND and/or NOR flash memory. The removable storage card may also include a storage card identifier. For example, this storage card identifier may be a serial number. In some embodiments, the BMC has a BMC identifier. A unique identifier for the combination of the BMC and the removable storage card may be formed using the storage card identifier and the BMC identifier.

In some embodiments, the BMC receives data for the network device. The data might include temperature data, power data, fan speed data, humidity data, accelerometer data and/or other operating data for the network device. The BMC stores the data on the removable storage card. In some embodiments, the removable storage card circularly stores the data. In some such embodiments, once a particular threshold is reached, the oldest data on the removable storage card is replaced by the most recent data. The removable storage card may store security data that is accessible by the BMC via the socket. For example, secure certificates and/or keys may be stored on the removable storage card.

In some embodiments, the removable storage card is coupled to the socket at a geographic location, such as a data center, in which the network device is to be deployed. In some embodiments, the data on the removable storage card is stored on the removable storage card at the geographic location. For example, the firmware of the BMC may be written to the removable storage card at the data center or other selected location. In some cases, multiple removable storage cards for multiple network devices may be written together. In addition, the BMC identifier and the removable storage card identifier may be associated together at the geographic location. For example, the identifiers for the BMC and the removable storage card may be used to form a single identifier for the combination.

If the circuit board including the BMC is to be decommissioned, the removable storage card may be decoupled from the socket. Thus, data on the removable storage card may be read to determine any trends, reasons for failures or other information desired to be obtained. In order to preserve the privacy of data written to the memory of the removable storage card, the removable storage card may be destroyed. Security of the firmware and other data may, therefore, be maintained. The BMC and other components of the circuit board (if any) may thus be reused without compromising secrecy of the data residing on the removable storage card. Consequently, performance may be improved and costs or waste reduced.

Figure 1B:
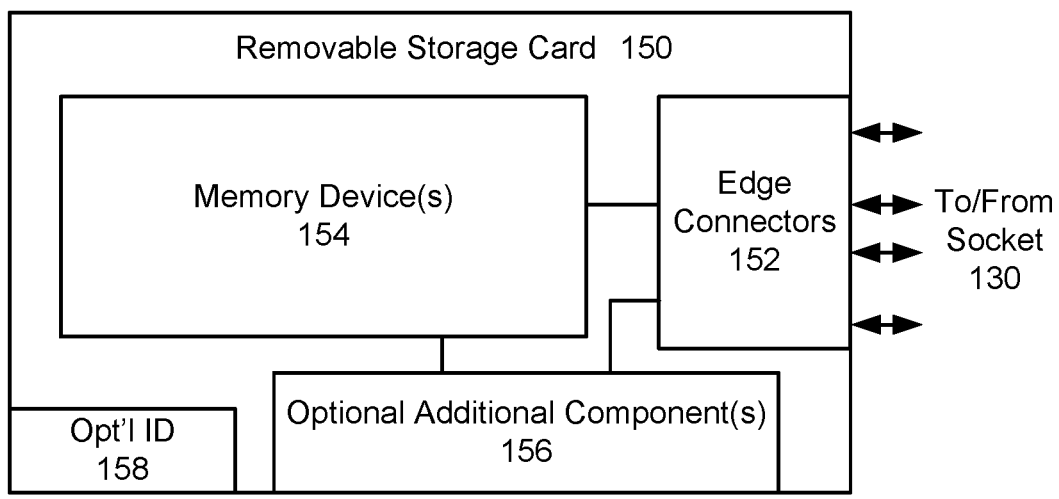

FIGS. 1A and 1B depict an embodiment of system 100 including circuit board 110 having embedded BMC 120 and removable storage card 150. System 100 may be a network device, such as a server. For clarity, only some components of network device 100 are depicted. System 100 includes circuit board 110, sensor(s) 122, other network device component(s) 124 and removable storage card 150. Circuit board 110 may be the main board of a network device, such as a server or ToR switch. Thus, circuit board 110 is referred to as a main board, but may be another board for a network device. Main board 110 includes processor(s) 112, storage 114, bus(es) 116, embedded BMC 120 and socket 130. Removable storage card 150 is removably connected to main board 110 via socket 130. Although components 110, 112, 114, 116, 120 and 130 are shown, main board 120 may include other components which are not depicted for clarity. For example, additional bus(es), ports, memory and/or controllers may be included as part of or connected to main board 110. Similarly, although only one socket 130 and removable storage card 150 are shown, multiple sockets 130 and multiple removable storage cards 150 might be used. Other sockets for other card may also be present in some embodiments. Further, particular connections between components 110, 112, 114, 116, 120 and 130 are shown. However, other and/or additional connections could be made.

BMC 120 provides a management interface for system 100. BMC 120 is a microcontroller may be used as part of an intelligent platform management interface (IPMI). BMC 120 receives data from sensors 122 and components 124. BMC 120 may also log (i.e. store) at least a portion of this data on removable storage card 150. BMC 120 may provide alerts or take action based upon the data, may control components 124 and may communicate with other network devices (not shown). BMC 120 may perform these functions independently of the processor(s) 112 and operating system or other software of network device 100. For example, BMC 120 may allow for recovery of network device 100 when network device 100 is in a failure mode or powered off (if power is still available to BMC 120). BMC 120 is shown as directly coupled to sensors 122 and components 124, for example via a dedicated interface. In some embodiments, BMC 120 may be coupled to sensors 122 and components 124 in another manner.

Removable storage card 150 includes edge connectors 152, memory device(s) 154, optional additional component(s) 156 and optional storage card identifier 158. Edge connectors 152 have a physical and electronic form factor that matches socket 130. Thus, removable storage card 150 is configured to be coupled to main board 110 via socket 130. In some embodiments, edge connectors 152 and socket 130 have a proprietary form factor. In such embodiments, generic removable cards do not fit and/or do not operate properly if plugged into socket 130. In other embodiments, edge connectors 152 and socket 130 have a standardized form factor. For example, edge connector 152 and socket 130 may have an M.2 form factor. In other embodiments, other form factors might be used.

Memory device(s) 154 of removable storage card 150 may include flash memory devices. For example, one or more NOR flash memory devices may be used for memory device(s) 154. In other embodiments, NAND flash memory may be used for memory device(s). In some embodiments, NOR and NAND flash memory may be included in memory device(s) 154. Optional additional component(s) 156 may include one or more other components desired to be incorporated onto removable storage card 150. For example, optional additional component(s) 156 may be an embedded multimedia card (eMMC), which incorporates a memory controller and memory. In other embodiments, optional additional component(s) 156 may be omitted. Optional storage card identifier 158 is part of removable storage card 150 in some embodiments, but omitted in other embodiments. Storage card identifier 158 may be a serial number that is stamped or otherwise affixed to removable storage card 150.

Removable storage card 150 and data stored thereon are accessible via socket 130. At least some of the data for BMC 120 desired to be kept secret is stored on removable storage card 150. In some embodiments, removable storage card 150 stores all data for BMC 120 that is desired to be kept private.

For example, security data such as certificates or keys can be stored on memory device(s) 154 and/or additional component(s) 156 of removable storage card 150. Similarly, at least a portion of the firmware of BMC 120 may be stored on removable storage card 150. In some embodiments, removable storage card 150 stores all of the firmware of BMC 120. BMC 120 may access this firmware via socket 130. In some embodiments, removable storage card 150 stores an image of at least part of BMC 120. Thus, removable storage card 150 may store a copy of the data and structure of BMC 120. As a result, BMC 120 may access removable storage card 150 for booting up, recovery and/or other purposes. In some embodiments, the basic input/output system (BIOS) for BMC 120 is stored on removable storage card 150. In other embodiments, the BIOS for BMC 120 may be stored elsewhere.

In some embodiments, other data that may (or may not) be desired to be kept secret is stored on removable storage card 150. BMC 120 may store data received from sensor(s) 122 and/or component(s) 124 on removable storage card 150. For example, temperature(s) of portion(s) of network device 100, voltage(s) on particular line(s), humidity, accelerometer data, status of processor(s) 112 and/or other portion(s) of network device 100 may be stored on removable storage card 150. In some embodiments, BMC 120 stores only a portion of the data received from sensor(s) 122 and/or component(s) 124. For example, BMC 120 may receive temperature data from a particular sensor 122 every second, but store the temperature data to memory device(s) 154 of removable storage card 150 every 5 seconds. Similarly, BMC 120 might receive data from three different temperature sensors 122, but only store data from one of the temperature sensors on removable storage card 150. What data are stored by BMC 120, the frequency with which the data are stored and other aspects of logging data from sensor(s) 122 and components 124 on removable storage card 150 may be configurable. In some embodiments, removable storage card 150 stores the data written by BMC 120 in a circular manner. Consequently, older data previously stored on removable storage card 150 is replaced by more recent data from BMC 120. In some embodiments, the older data is discarded when new data is written after a particular threshold of memory occupancy has been reached in removable storage card 150.

Thus, BMC 120 accesses at least a portion of its firmware stored on removable storage card 150 via socket 130. BMC 120 may store and/or read secure data such as certificate data or security keys on removable storage card 150 through socket 130. BMC 120 may also use removable storage card 150 to store on removable storage card 150 other data related to operation of network device 100. In some embodiments, other components of network device 100 might access removable storage card 150. For example, processor(s) 112 may store and/or read data from removable storage card 150 via socket 130. In some embodiments, at least a portion of the data accessed by other components of network device 100 and stored on removable storage card 150 may be desired to be kept private. Data for BMC 120 and/or other components of network device 100 desired to be kept secure is retained on removable storage card 150. In addition, data related to status and performance of network device 100 may be stored by BMC 120 on removable storage card 150.

Use of removable storage card 150 may improve performance and maintenance of network device 100. In some embodiments, changes to memory device(s) 154 may require physical access to the memory device(s) 154. Physical access may be required for security reasons. Because removable storage card 150 is more readily accessible and removable than memory embedded on main board 110, changes requiring physical access to removable storage card 150 may be more easily made. For example, changes to stored data such as firmware for BMC 120 or changes to memory device 154 may be more readily accomplished than if memory device(s) 154 were embedded on main board 110.

If network device 100 is desired to be decommissioned or main board 110 desired to be replaced, removable storage card 150 may be decoupled from socket 130. To preserve the security of the data stored thereon, removable storage card 150 can be destroyed. The removal and destruction of removable storage card 150 may be tracked using removable storage card 158. However, remaining portions of main board 110 need not be destroyed. Consequently, BMC 120, processor(s) 112, memory 114 and/or other components may be reused, recycled, donated or otherwise utilized. As a result, data integrity for network device 100 may be preserved while costs and waste reduced. Decoupling of removable storage card 150 from socket 130 may also be simpler than removal of main board 110 from network device 100. Thus, destruction of sensitive data may be simplified and made less time consuming.

After being decoupled from socket 130, data on removable storage card 150 may be reviewed. For example, data stored by BMC 120 related to performance of network device 100 may be examined. This examination may occur immediately prior to destruction of removable storage card 150, allowing a record of the status of network device 100 to be saved after network device 100 is decommissioned. In some cases, removable storage card 150 may be decoupled from socket 130 for reasons other than the destruction of removable storage card 150. In some cases, data on removable storage card 150 may be examined to investigate the status of network device 100. For example, network device 100 may become inoperable. Removable storage card 150 may be separated from socket 130 to diagnose conditions that may have resulted in the failure of network device 100. Once the reason for the failure is determined, removable storage card 150 may be replaced in socket 130. Thus, use of removable storage card 150 in network device 100 may improve performance of network device 100 as well as facilitate changes to memory and/or decommissioning of network device 100.

Figure 2:
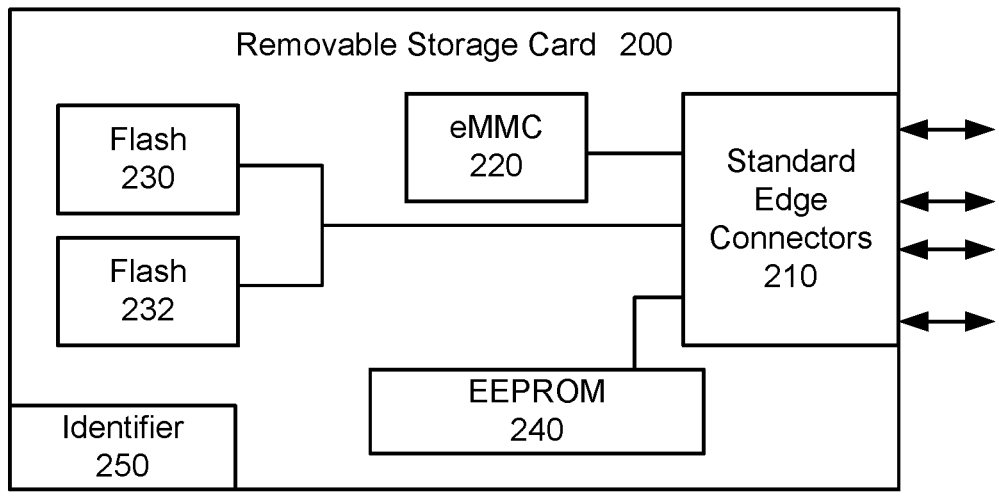
FIG. 2 depicts another embodiment of a removable storage card.

FIG. 2 depicts another embodiment of removable storage card 200. For clarity, only some portions of removable storage card 200 are depicted. Removable storage card 200 is analogous to removable storage card 150. Removable storage card 200 includes standard edge connectors 210, flash memory devices 230 and 232, eMMC 220, electrically erasable and programmable read only memory (EEPROM) 240 and storage card identified 250. Standard edge connectors 210 are analogous to edge connectors 152. Flash memory devices 230 and 232 EEPROM 240 and eMMC 220 are analogous to memory device(s) 154. Storage card identifier 250 is analogous to identifier 158. Other and/or additional components might be included on removable storage card 200.

Standard edge connectors 210 are configured to electrically and physically mate with a socket of a network device, such as socket 130. For example, standard edge connectors 210, and thus socket 130, may have an M.2 form factor. Use of such a form factor may reduce the probability that another card is inadvertently placed in the socket such as socket 130. In other embodiments, another standard or proprietary form factor might be sued for edge connectors 210 and socket 130.

In removable storage card 200, eMMC 220, flash memory devices 230 and 232 and EEPROM 240 store data. For example, eMMC 220 may store firmware for a BMC, such as BMC 120. One or more of flash memory devices 230 and 232 may be used to store data provided by a BMC. For example, BMC 120 may store data from sensor(s) 122 and/or other component(s) 124 in flash memory device(s) 230 and/or 232.

Use of removable storage card 200 may improve performance and maintenance of a network device in a manner analogous to removable storage card 150. In some embodiments, changes to eMMC 220, flash memory devices 230 and 232 and/or EEPROM 240 may require physical access to the memory device(s) 154. Because removable storage card 200 may be more readily accessible and removable, changes requiring physical access may be more easily made. If the network device housing removable storage card 200 is desired to be decommissioned or the corresponding main board (not shown in FIG. 2) desired to be replaced, removable storage card 200 may be decoupled from the socket. To preserve the security of the data stored thereon, removable storage card 200 can be destroyed. The removal and destruction of removable storage card 200 may be tracked using removable storage card identifier 250. However, remaining portions of main board need not be destroyed. Consequently, other components may be reused, recycled, donated or otherwise utilized. As a result, data integrity for the network device may be preserved while costs and waste reduced. Decoupling of removable storage card 200 from the socket may also be simpler than removal of the main board from the network device. Thus, destruction of sensitive data may be simplified and made less time consuming. After being decoupled from the socket, data on removable storage card 200 may be reviewed. Thus, the history of the corresponding network device may be examined. Consequently, performance and use of removable storage card 200 may be improved.

Figure 3:
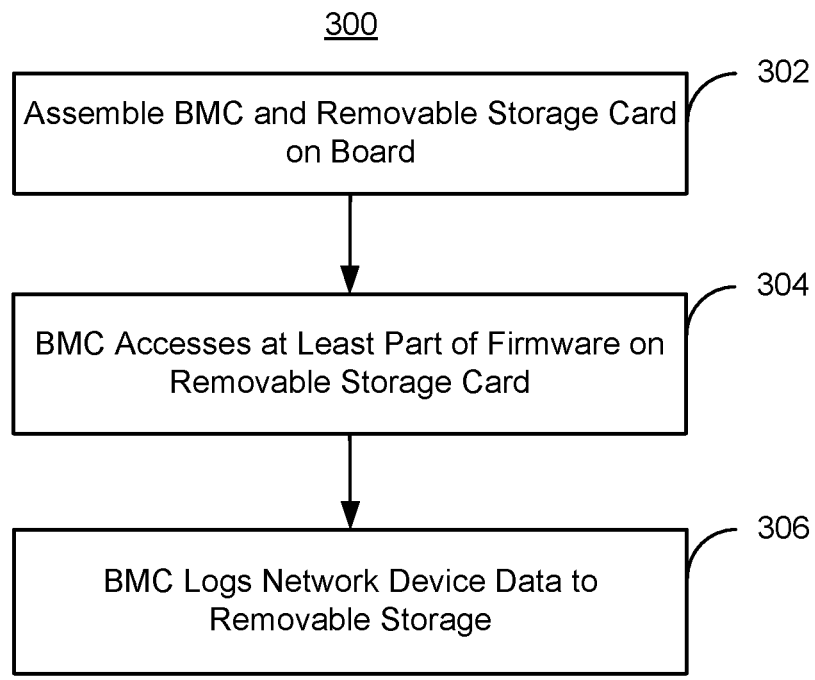
FIG. 3 depicts an embodiment of a method for deploying and using a removable storage card with a system including a baseboard management controller.

FIG. 3 is a flow chart depicting an embodiment of method 300 for deploying and using a removable storage card with a system including a BMC. Method 300 is described in the context of network device 100 and removable storage card 200. However, method 300 may be utilized with other systems, network devices and/or storage cards. Although shown in a particular order, at least some of the processes may be performed in another order including but not limited to in parallel. For simplicity, only some of the processes may be shown. Method 300 is also discussed in the context of single devices, such as a single removable storage card. In some embodiments, one or more of the processes may be carried out serially or in parallel for multiple devices.

The removable storage card and BMC are united on the main board for a network device, at 302. At 302, the removable storage card may also be prepared for use. In some embodiments, data is written to the removable storage card. For example, the firmware and other preloaded data may be stored on the removable storage card. The removable storage card may be plugged into the appropriate socket on the main board after or before the preloaded data is written. At 302, therefore, the removable storage card is removably connected to the socket. The BMC may also be attached to the main board as part of 302. In some embodiments, the main board and BMC are assembled and delivered to a geographic location, such as a data center, in which the network device is to be used. The removable storage card may be added to the main board at that geographic location. In some embodiments, the BMC firmware and other preloaded data are written to the removable storage card at that geographic location. In other embodiments, the BMC and removable storage card are provided on the main board at other location(s) and the assembled main board delivered to the geographic location at which the corresponding network device is to be used. In some embodiments, the remaining portions of the network device are also assembled as part of 302. The storage card identifier for the removable storage card may also be associated with an identifier for the BMC as part of 302. In some embodiments, the identifier for the BMC may be an identifier for the main board. Thus, a unique identifier for the combination of the BMC (and/or main board) and removable storage card may be generated as part of 302. After 302 is completed, the main board, BMC and removable storage card may be ready for use. However, removable storage card may still be removed from the socket.

The BMC accesses at least part of its firmware from the removable storage card via the socket, at 304. Thus, 304 may be part of normal operation of the BMC, main board and removable storage card. In some embodiments, the BIOS for the BMC is also stored on the removable storage card. Thus, this information may be accessed by the BMC.

The BMC stores data for the network device on the removable storage card, at 306. This may also be part of normal operation of the BMC. For example, the BMC may receive data from various sensors and/or components of the network device, as well as data from other network device(s). The BMC stores at least some of this data on the removable storage card, for example in the memory device(s). This storage process may be viewed as the BMC logging information about the network device and/or network on the removable storage card.

For example, removable storage card 200 may be (removably) plugged into socket 130 of main board 110 at 302. Main board 110 including removable storage card 200 (e.g. in place of or in addition to removable storage card 150) may then be ready for use in network device 100. At 304, BMC 120 accesses removable storage card 200 via socket 130. At least part of the firmware for BMC 120 may be stored on eMMC 220. Thus, BMC 120 accesses this firmware on eMMC 220 and utilizes the firmware for operation. BMC 120 may receive data from sensor(s) 122 and/or component(s) 124. In addition, BMC 120 may receive data from other network devices. At 306, BMC 120 stores at least some of this data on removable storage card 200. For example, BMC may store this data in flash memory device(s) 230 and/or 232.

Using method 300, a removable storage card may be used in connection with a BMC. Because a removable storage card is used in the network device, the memory devices and other components on the removable storage card are more easily physically accessed. Changes to data in the removable storage card that require physical access to the removable storage card may be facilitated. If the data stored on the removable storage card is desired to be investigated, the removable storage card may be decoupled from the main board and plugged into another system for examination. During this investigation, another removable storage card may be plugged into the main board so that the network device can continue its operation. If the network device and/or main board are to be decommissioned, then the data on the removable storage card can be secured by destroying the removable storage card. Thus, privacy of the data on the removable storage card can by preserved without requiring the remaining portions of the main board to be destroyed. Thus, maintaining the security of private data may be made less expensive and easier. As a result, performance and use of a network device may be improved.

Figure 4:
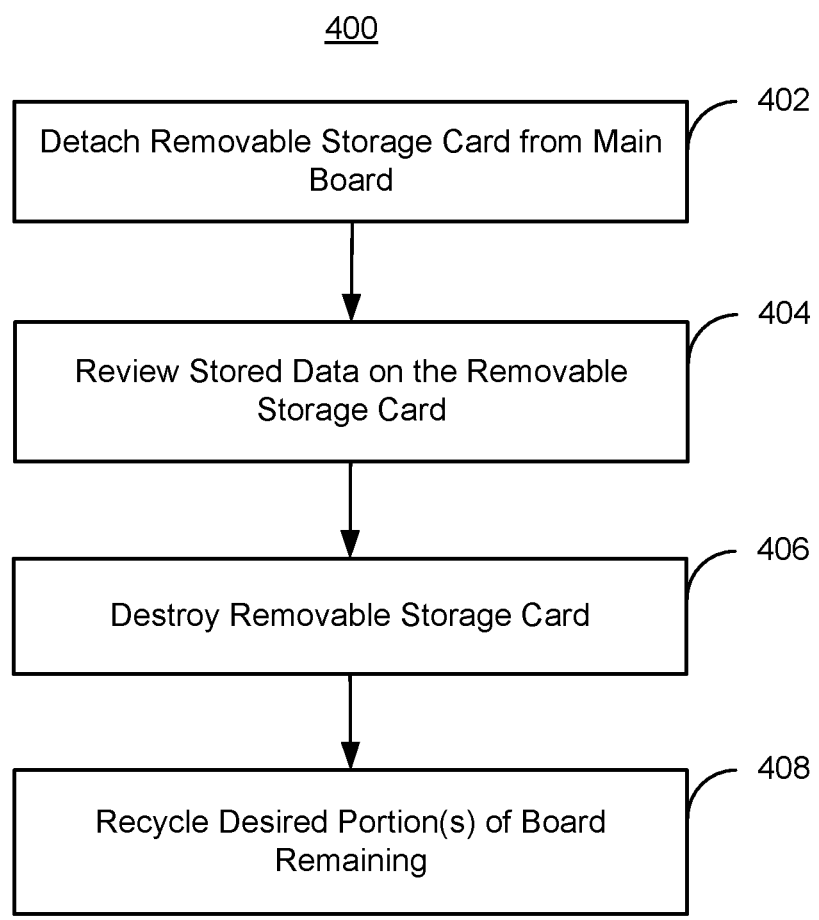
FIG. 4 depicts an embodiment of a method for decommissioning a network device including a baseboard management controller and another embodiment of a removable storage card.

FIG. 4 is a flow chart depicting an embodiment of method 400 for decommissioning a system including a BMC and a removable storage card. Method 400 is described in the context of network device 100 and removable storage card 200. However, method 400 may be utilized with other systems, network devices and/or storage cards. Although shown in a particular order, at least some of the processes may be performed in another order including but not limited to in parallel. For simplicity, only some of the processes may be shown. Method 400 is also discussed in the context of single devices, such as a single removable storage card. In some embodiments, one or more of the processes may be carried out serially or in parallel for multiple devices.

The removable storage card is detached from the main board of a network device, at 402. Because the removable storage card is removably connected to a socket and may be physically more easily accessible than the main board, at 402 the memory device(s) and other components of the removable storage card may be more readily obtained.

The data stored on the memory device(s) and other components of the removable storage card is reviewed, at 404. At 404, therefore, data stored by the BMC relating to network device performance may be obtained from the removable storage card. For example, conditions which correspond to failures or which are detrimental to performance may be identified. In some embodiments in which the network device and/or the removable storage card are not to be replaced, method 400 may terminate at 404. In some embodiments in which the network device and/or the removable storage card are desired to continue to be used, the removable storage card may be replaced in the socket at 404 and method 400 terminated.

If, however, the network device and/or the removable storage card are to be decommissioned, then the removable storage card is destroyed, at 406. In some embodiments, 406 includes rendering the removable storage card unable to be used and unable to have data read from the removable storage card.

The remaining portions of the main board and/or network device may be reused or recycled, at 408. For example, the main board, its processors and BMC may be donated for use in another computing device. In some embodiments, a new removable storage card may be coupled to the socket allowing the remaining portions of the main board, its processors and BMC to be reused.

For example, removable storage card 200 may be detached from socket 130 of main board 110 at 402. The desired data stored on removable storage card 200 may be reviewed and/or stored elsewhere, at 404. If desired, removable storage card 200 may then be destroyed at 406. The main board 110, processor(s) 112, storage 114 BMC 120, other sensor(s) 122, other component(s) 124 and/or other portions of network device 100 may be reused, donated, recycled or otherwise made use of, at 408.

Using method 400, data on a removable storage card may be more readily accessed and more readily destroyed if desired. Data stored on the removable storage card is more easily investigated. If the network device and/or main board are to be decommissioned, then the data on the removable storage card can be secured by destroying the removable storage card. Thus, privacy of the data on the removable storage card can by preserved without requiring the remaining portions of the main board to be destroyed. Thus, maintaining the security of private data may be made less expensive and easier. As a result, performance and use of a network device may be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a baseboard management controller (BMC) configured to provide a management interface to a network device; and
   a circuit board including a socket configured to accept an edge connector of a removable storage card, wherein the BMC is embedded on the circuit board and configured to access via the socket at least a portion of a firmware of the BMC stored on the removable storage card;
   wherein the BMC is configured to be unable to boot up without accessing the at least the portion of the firmware on the removable storage card.

2. The system of claim 1, wherein the removable storage card includes:
   at least one flash memory device.

3. The system of claim 2, wherein the at least one flash memory devices stored the portion of the firmware.

4. The system of claim 1, wherein the BMC receives data for the network device, the BMC storing the data on the removable storage card.

5. The system of claim 4, wherein the data includes at least one of temperature data, network device power data, humidity data and accelerometer data.

6. The system of claim 4, wherein the removable storage card circularly stores the data.

7. The system of claim 2, wherein the removable storage card further includes an embedded multimedia card (eMMC).

8. The system of claim 1, wherein the removable storage card stores security data accessible by the BMC via the socket, the security data includes at least one of a certificate or a key.

9. The system of claim 1, wherein the removable storage card further includes a storage card identifier.

10. The system of claim 9, wherein the BMC has a BMC identifier, a unique identifier including the storage card identifier and the BMC identifier.

11. A removable storage card, comprising:
    an edge connector configured to removably fit a socket of a circuit board, the circuit board having embedded thereon a baseboard management controller (BMC) configured to provide a management interface to a network device; and
    a memory for storing at least a portion of a firmware of the BMC, the BMC being configured to access via the socket the at least the portion of the firmware of the BMC stored on the removable storage card;
    wherein the BMC is configured to be unable to boot up without accessing the at least the portion of the firmware on the removable storage card.

12. The removable storage card of claim 11, wherein the memory includes:
    at least one flash memory device.

13. The removable storage card of claim 11, wherein the memory further stores data for the network device, the BMC storing the data in the memory of the removable storage card.

14. The removable storage card of claim 12, wherein the removable storage card circularly stores the data.

15. The removable storage card of claim 11, further comprising:
an embedded multimedia card (eMMC).

16. The removable storage card of claim 11, further comprising:
a storage card identifier.

17. A method, comprising:
accessing, by a baseboard management controller (BMC) configured to provide a management interface to a network device, at least a portion of a firmware of the BMC stored on a removable storage card, the removable storage card being removably coupled to a socket of a circuit board, the BMC being embedded on the circuit board and accessing the at least the portion of the firmware via the socket;
wherein the BMC is configured to be unable to boot up without accessing the at least the portion of the firmware on the removable storage card.

18. The method of claim 17, wherein the removable storage card includes at least one flash memory device and wherein the method further includes:
storing, by the BMC, data for the network device on the removable storage card.

19. The method of claim 18, wherein the removable storage card circularly stores the data.

20. The method of claim 17, wherein the BMC has a BMC identifier, the removable storage card has a storage card identifier, the method further comprising:
associating the BMC identifier with the storage card identifier to provide a unique identifier system identifier.

* * * * *